US011947303B1

(12) United States Patent
Goin

(10) Patent No.: US 11,947,303 B1
(45) Date of Patent: Apr. 2, 2024

(54) CLEANER ASSEMBLY WITH FABRIC SEAL FOR REMOVING WASTE TONER WITHIN AN IMAGE FORMING DEVICE

(71) Applicant: LEXMARK INTERNATIONAL, INC., Lexington, KY (US)

(72) Inventor: Richard Louis Goin, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 18/095,584

(22) Filed: Jan. 11, 2023

(51) Int. Cl.
*G03G 21/00* (2006.01)

(52) U.S. Cl.
CPC . *G03G 21/0011* (2013.01); *G03G 2221/0005* (2013.01)

(58) Field of Classification Search
CPC ....... G03G 21/0011; G03G 2221/0005; G03G 2221/1648
See application file for complete search history.

(56) References Cited

U.S. PATENT DOCUMENTS

| | | | | | |
|---|---|---|---|---|---|
| 5,363,182 | A | 11/1994 | Kuribayashi | | |
| 6,553,195 | B2 | 4/2003 | Korfhage et al. | | |
| 8,224,224 | B2 | 7/2012 | Ohmori et al. | | |
| 8,886,080 | B2 | 11/2014 | Allen et al. | | |
| 9,891,578 | B2 | 2/2018 | Gilliam et al. | | |
| 10,025,267 | B2 | 7/2018 | Boettcher et al. | | |
| 2004/0240915 | A1 | 12/2004 | Nakayama | | |
| 2010/0028045 | A1* | 2/2010 | Kawakami | G03G 21/0011 | 399/123 |
| 2013/0287429 | A1* | 10/2013 | Allen | G03G 21/0029 | 399/350 |
| 2014/0064778 | A1* | 3/2014 | Uneme | G03G 15/0817 | 399/103 |
| 2015/0338819 | A1 | 11/2015 | Ai | | |
| 2023/0288844 | A1* | 9/2023 | Inaba | G03G 21/0011 | 399/102 |

FOREIGN PATENT DOCUMENTS

| | | |
|---|---|---|
| JP | H01-188875 A | 7/1989 |
| JP | H01-235986 A | 9/1989 |
| JP | H02-028687 A | 1/1990 |
| JP | H02-106780 A | 4/1990 |
| JP | H08-095454 A | 4/1996 |
| JP | 2006-091566 A | 4/2006 |

* cited by examiner

*Primary Examiner* — Sophia S Chen

(57) ABSTRACT

A cleaner assembly includes a cleaner blade having a cleaning edge in contact with a photoconductive drum for removing toner therefrom. An elongated seal extends along a length of the cleaner blade such that an opening for capturing toner removed from the photoconductive drum is formed between the cleaning edge and the elongated seal. The elongated seal includes a tab projecting across a longitudinal end section of the cleaner blade such that the tab is positioned between the cleaning edge and the photoconductive drum preventing contact between the cleaning edge and the photoconductive drum. A fabric seal is positioned in a portion of the opening formed between the cleaning edge and the elongated seal at the longitudinal end section of the cleaner blade. At least a portion of the fabric seal is positioned inboard of the tab of the elongated seal along the length of the cleaner blade.

18 Claims, 7 Drawing Sheets

CLEANER ASSEMBLY WITH FABRIC SEAL FOR REMOVING WASTE TONER WITHIN AN IMAGE FORMING DEVICE

CROSS REFERENCES TO RELATED APPLICATIONS

None.

BACKGROUND

1. Field of the Disclosure

The present disclosure relates generally to image forming devices and more particularly to a cleaner assembly with fabric seal for removing waste toner within an image forming device.

2. Description of the Related Art

Image forming devices such as copiers, laser printers, facsimile machines, and the like, include a photoconductive drum having a rigid cylindrical surface that is coated along a defined length of its outer surface. The surface of the photoconductive drum is charged by a charge roll to a uniform electrical potential and then selectively exposed to light in a pattern corresponding to an original image. Those areas of the photoconductive surface exposed to light are electrically discharged thereby forming a latent electrostatic image on the photoconductive surface. A charged developer material, such as toner, is brought into contact with the photoconductive drum's surface by a developer roll such that the charged toner attaches to the discharged areas of the photoconductive surface. The toner on the photoconductive drum is then transferred onto a recording medium, such as a media sheet or a transfer belt for subsequent transfer to a media sheet.

During transfer of the toner to the recording medium, some of the toner may not be transferred and may remain on the photoconductive drum. If not removed, such residual toner may contaminate the charge roll or inadvertently transfer to a subsequent media sheet resulting in print defects. Accordingly, removal of the residual toner is necessary prior to preparing the photoconductive drum to receive a new image in order to prevent or reduce the likelihood of print defects. In preparation for a next image forming cycle, the photoconductive surface may be optionally discharged and cleaned by a cleaner blade. The cleaner blade may be positioned in proximity to the photoconductive drum such that its edge contacts the photoconductive surface to wipe off residual toner therefrom. Seals are typically used at the ends of the cleaner blade to prevent leaks. Improved toner sealing is desired.

SUMMARY

A cleaner assembly for use in an image forming device according to one example embodiment includes a rotatable photoconductive drum and a cleaner blade having a cleaning edge in contact with an outer surface of the photoconductive drum along a longitudinal dimension of the photoconductive drum for removing toner from the outer surface of the photoconductive drum. An elongated seal is disposed adjacent to the cleaner blade and extends along a length of the cleaner blade such that an opening for capturing toner removed from the outer surface of the photoconductive drum is formed between the cleaning edge of the cleaner blade and the elongated seal. The elongated seal includes a tab projecting across a longitudinal end section of the cleaner blade such that the tab is positioned between the cleaning edge of the cleaner blade and the outer surface of the photoconductive drum at the longitudinal end section of the cleaner blade preventing contact between the cleaning edge of the cleaner blade and the outer surface of the photoconductive drum at the longitudinal end section of the cleaner blade. A fabric seal is positioned in a portion of the opening formed between the cleaning edge of the cleaner blade and the elongated seal at the longitudinal end section of the cleaner blade. At least a portion of the fabric seal is positioned inboard of the tab of the elongated seal along the length of the cleaner blade.

In some embodiments, at least a portion of the fabric seal is disposed upstream from the cleaning edge of the cleaner blade relative to an operative rotational direction of the photoconductive drum.

Embodiments include those wherein the fabric seal includes a woven fabric layer backed by a foam layer. The woven fabric layer includes fibers that are oriented to capture toner from the outer surface of the photoconductive drum and impede the captured toner from moving across the fabric seal toward the tab. In some embodiments, the fibers are oriented at an angle relative to the longitudinal dimension of the photoconductive drum.

A cleaner assembly for use in an image forming device according to another example embodiment includes a rotatable photoconductive drum and a cleaner blade having a cleaning edge in contact with an outer surface of the photoconductive drum along a longitudinal dimension of the photoconductive drum for removing toner from the outer surface of the photoconductive drum. A fabric seal is disposed upstream from the cleaning edge of the cleaner blade relative to an operative rotational direction of the photoconductive drum. An elongated seal is disposed adjacent to the cleaner blade and extends along a length of the cleaner blade such that an opening for capturing toner removed from the outer surface of the photoconductive drum is formed between the cleaning edge of the cleaner blade and the elongated seal. The elongated seal includes a tab projecting across a longitudinal end section of the cleaner blade such that (1) the tab prevents contact between the cleaning edge of the cleaner blade and the outer surface of the photoconductive drum at the longitudinal end section of the cleaner blade and between a portion of the fabric seal and the outer surface of the photoconductive drum at the longitudinal end section of the cleaner blade and (2) a remaining portion of the cleaning edge of the cleaner blade and a remaining portion of the fabric seal are exposed to contact the outer surface of the photoconductive drum.

In some embodiments, said remaining portion of the fabric seal is positioned in a portion of the opening formed between the cleaning edge of the cleaner blade and the elongated seal at the longitudinal end section of the cleaner blade. In other embodiments, said remaining portion of the fabric seal is positioned inboard of the tab of the elongated seal along the length of the cleaner blade.

A cleaner assembly for use in an image forming device according to another example embodiment includes a rotatable photoconductive drum and a cleaner blade having a cleaning edge in contact with an outer surface of the photoconductive drum along a longitudinal dimension of the photoconductive drum for removing toner from the outer surface of the photoconductive drum. An elongated seal is disposed adjacent to the cleaner blade and extends along a length of the cleaner blade such that an opening for capturing toner removed from the outer surface of the photoconductive drum is formed between the cleaning edge of the cleaner blade and the elongated seal. The elongated seal includes a tab projecting across a longitudinal end section of the cleaner blade such that the tab is positioned between the cleaning edge of the cleaner blade and the outer surface of the photoconductive drum at the longitudinal end section of the cleaner blade preventing contact between the cleaning edge of the cleaner blade and the outer surface of the photoconductive drum at the longitudinal end section of the cleaner blade. A fabric seal is disposed upstream from the longitudinal end section of the cleaner blade relative to a direction of rotation of the photoconductive drum. The fabric seal has an edge that abuts the cleaning edge of the cleaner blade at the longitudinal end section of the cleaner blade with at least a portion of the edge of the fabric seal extending toward the opening from an inboard edge of the tab along the length of the cleaner blade.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
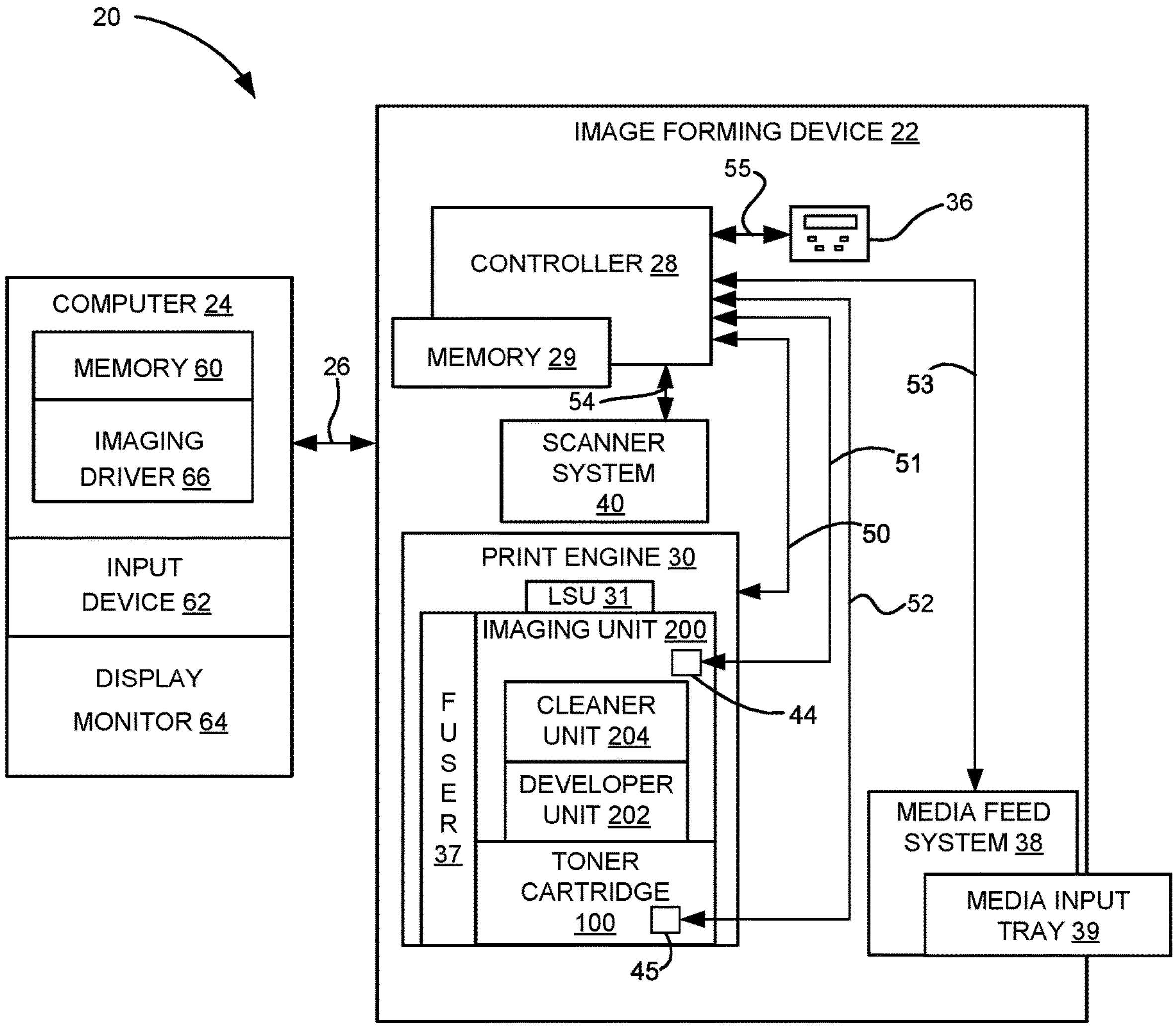
FIG. 1 is a schematic view of an image forming device according to one example embodiment.

Referring now to the drawings and particularly to FIG. 1, there is shown a block diagram depiction of an imaging system 20 according to one example embodiment. Imaging system 20 includes an image forming device 22 and a computer 24. Image forming device 22 communicates with computer 24 via a communications link 26. As used herein, the term “communications link” generally refers to any structure that facilitates electronic communication between multiple components and may operate using wired or wireless technology and may include communications over the Internet.

In the example embodiment shown in FIG. 1, image forming device 22 is a multifunction machine (sometimes referred to as an all-in-one (AIO) device) that includes a controller 28, a print engine 30, a laser scan unit (LSU) 31, an imaging unit 200, a toner cartridge 100, a user interface 36, a media feed system 38, a media input tray 39 and a scanner system 40. Image forming device 22 may communicate with computer 24 via a standard communication protocol, such as, for example, universal serial bus (USB), Ethernet or IEEE 802.xx. Image forming device 22 may be, for example, an electrophotographic printer/copier including an integrated scanner system 40 or a standalone electrophotographic printer.

Controller 28 includes a processor unit and associated electronic memory 29. The processor may include one or more integrated circuits in the form of a microprocessor or central processing unit and may be formed as one or more application-specific integrated circuits (ASICs). Memory 29 may be any volatile or non-volatile memory or combination thereof, such as, for example, random access memory (RAM), read only memory (ROM), flash memory and/or non-volatile RAM (NVRAM). Memory 29 may be in the form of a separate memory (e.g., RAM, ROM, and/or NVRAM), a hard drive, a CD or DVD drive, or any memory device convenient for use with controller 28. Controller 28 may be, for example, a combined printer and scanner controller.

In the example embodiment illustrated, controller 28 communicates with print engine 30 via a communications link 50. Controller 28 communicates with imaging unit 200 and processing circuitry 44 thereon via a communications link 51. Controller 28 communicates with toner cartridge 100 and processing circuitry 45 thereon via a communications link 52. Controller 28 communicates with media feed system 38 via a communications link 53. Controller 28 communicates with scanner system 40 via a communications link 54. User interface 36 is communicatively coupled to controller 28 via a communications link 55. Controller 28 processes print and scan data and operates print engine 30 during printing and scanner system 40 during scanning. Processing circuitry 44, 45 may provide authentication functions, safety and operational interlocks, operating parameters and usage information related to imaging unit 200 and toner cartridge 100, respectively. Each of processing circuitry 44, 45 includes a processor unit and associated electronic memory. As discussed above, the processor may include one or more integrated circuits in the form of a microprocessor or central processing unit and may include one or more application-specific integrated circuits (ASICs). The memory may be any volatile or non-volatile memory or combination thereof or any memory device convenient for use with processing circuitry 44, 45.

Computer 24, which is optional, may be, for example, a personal computer, including electronic memory 60, such as RAM, ROM, and/or NVRAM, an input device 62, such as a keyboard and/or a mouse, and a display monitor 64. Computer 24 also includes a processor, input/output (I/O) interfaces, and may include at least one mass data storage device, such as a hard drive, a CD-ROM and/or a DVD unit (not shown). Computer 24 may also be a device capable of communicating with image forming device 22 other than a personal computer such as, for example, a tablet computer, a smartphone, or other electronic device.

In the example embodiment illustrated, computer 24 includes in its memory a software program including program instructions that function as an imaging driver 66, e.g., printer/scanner driver software, for image forming device 22. Imaging driver 66 is in communication with controller 28 of image forming device 22 via communications link 26. Imaging driver 66 facilitates communication between image forming device 22 and computer 24. One aspect of imaging driver 66 may be, for example, to provide formatted print data to image forming device 22, and more particularly to print engine 30, to print an image. Another aspect of imaging driver 66 may be, for example, to facilitate collection of scanned data from scanner system 40.

In some circumstances, it may be desirable to operate image forming device 22 in a standalone mode. In the standalone mode, image forming device 22 is capable of functioning without computer 24. Accordingly, all or a portion of imaging driver 66, or a similar driver, may be located in controller 28 of image forming device 22 so as to accommodate printing and/or scanning functionality when operating in the standalone mode.

Print engine 30 includes laser scan unit (LSU) 31, toner cartridge 100, imaging unit 200 and a fuser 37, all mounted within image forming device 22. Imaging unit 200 is removably mounted in image forming device 22 and includes a developer unit 202 that houses a toner sump and a toner development system. In one embodiment, the toner development system utilizes what is commonly referred to as a single component development system. In this embodiment, the toner development system includes a toner adder roll that provides toner from the toner sump to a developer roll. A doctor blade provides a metered uniform layer of toner on the surface of the developer roll. In another embodiment, the toner development system utilizes what is commonly referred to as a dual component development system. In this embodiment, toner in the toner sump of developer unit 202 is mixed with magnetic carrier beads. The magnetic carrier beads may be coated with a polymeric film to provide triboelectric properties to attract toner to the carrier beads as the toner and the magnetic carrier beads are mixed in the toner sump. In this embodiment, developer unit 202 includes a magnetic roll that attracts the magnetic carrier beads having toner thereon to the magnetic roll through the use of magnetic fields. Imaging unit 200 also includes a cleaner unit 204 that houses a photoconductive drum and a waste toner removal system.

Toner cartridge 100 is removably mounted in imaging forming device 22 in a mating relationship with developer unit 202 of imaging unit 200. An outlet port on toner cartridge 100 communicates with an inlet port on developer unit 202 allowing toner to be periodically transferred from toner cartridge 100 to resupply the toner sump in developer unit 202.

The electrophotographic printing process is well known in the art and, therefore, is described briefly herein. During a printing operation, laser scan unit 31 creates a latent image on the photoconductive drum in cleaner unit 204. Toner is transferred from the toner sump in developer unit 202 to the latent image on the photoconductive drum by the developer roll to create a toned image. The toned image is then transferred to a media sheet received by imaging unit 200 from media input tray 39 for printing. Toner may be transferred directly to the media sheet by the photoconductive drum or by an intermediate transfer member that receives the toner from the photoconductive drum. Toner remnants are removed from the photoconductive drum by the waste toner removal system. The toner image is bonded to the media sheet in fuser 37 and then sent to an output location or to one or more finishing options such as a duplexer, a stapler or a hole-punch.

Figure 2:
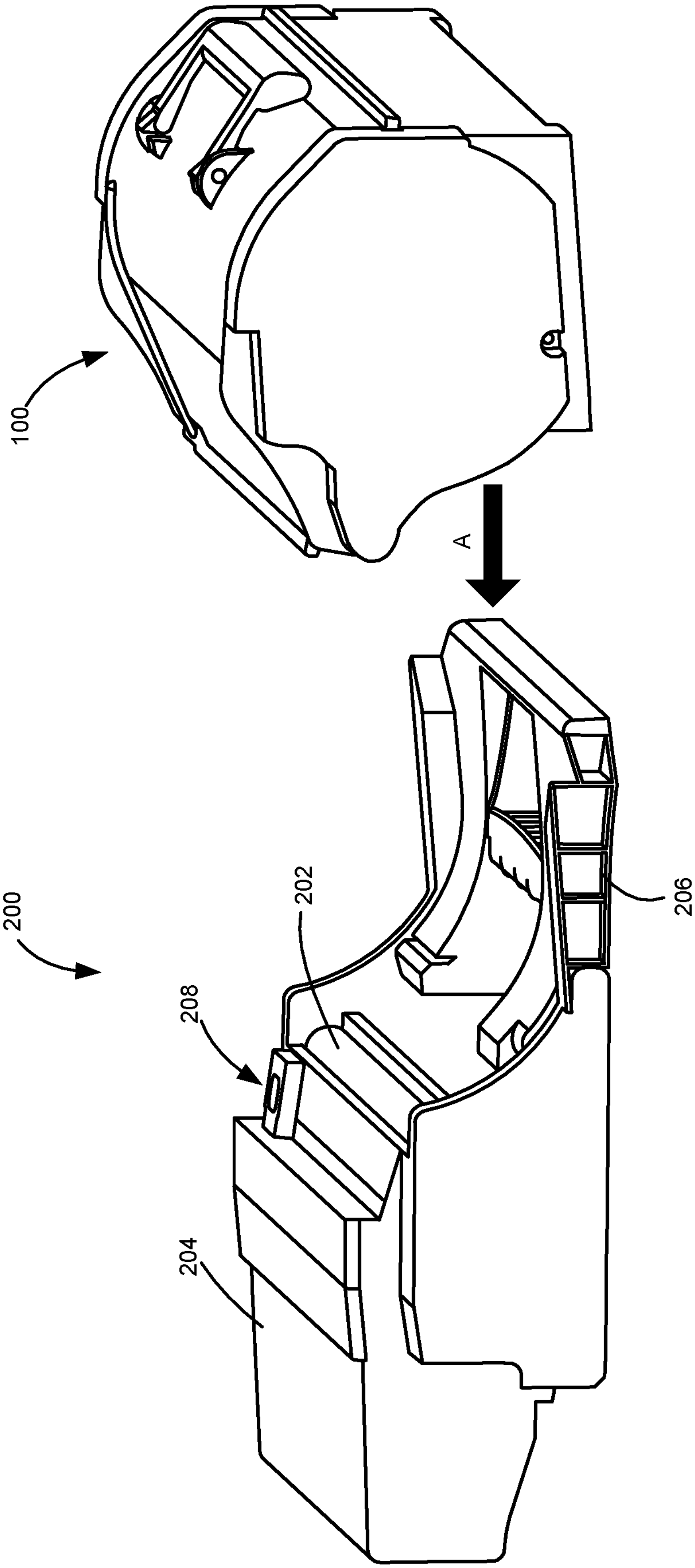
FIG. 2 is a perspective view of an imaging unit and a toner cartridge according to one example embodiment.

Referring now to FIG. 2, toner cartridge 100 and imaging unit 200 are shown according to one example embodiment. Imaging unit 200 includes a developer unit 202 and cleaner unit 204 mounted on a common frame 206. Developer unit 202 includes a toner inlet port 208 positioned to receive toner from toner cartridge 100. As discussed above, imaging unit 200 and toner cartridge 100 are each removably installed in image forming device 22. Imaging unit 200 is first slidably inserted into image forming device 22. Toner cartridge 100 is then inserted into image forming device 22 and onto frame 206 in a mating relationship with developer unit 202 of imaging unit 200 as indicated by the arrow A shown in FIG. 2, which also indicates the direction of insertion of imaging unit 200 and toner cartridge 100 into image forming device 22. This arrangement allows toner cartridge 100 to be removed and reinserted easily when replacing an empty toner cartridge 100 without having to remove imaging unit 200. Imaging unit 200 may also be readily removed as desired in order to maintain, repair or replace the components associated with developer unit 202, cleaner unit 204 or frame 206 or to clear a media jam.

As mentioned, toner cartridge 100 removably mates with developer unit 202 of imaging unit 200. An exit port (not shown) on toner cartridge 100 communicates with inlet port 208 on developer unit 202 allowing toner to be periodically transferred from toner cartridge 100 to resupply the toner sump in developer unit 202.

Figure 3:
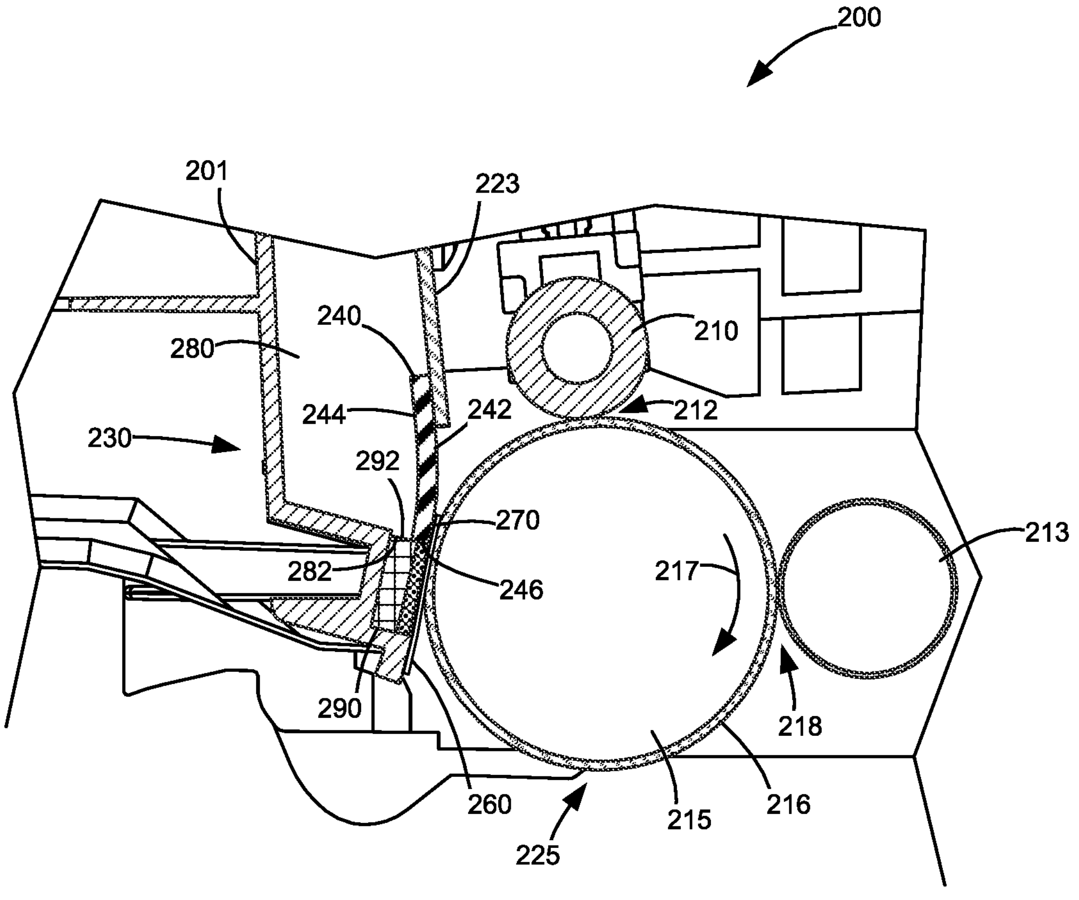
FIG. 3 is a side sectional view of a portion of the imaging unit shown in FIG. 2 showing a cleaner assembly according to one example embodiment.
Figure 4:
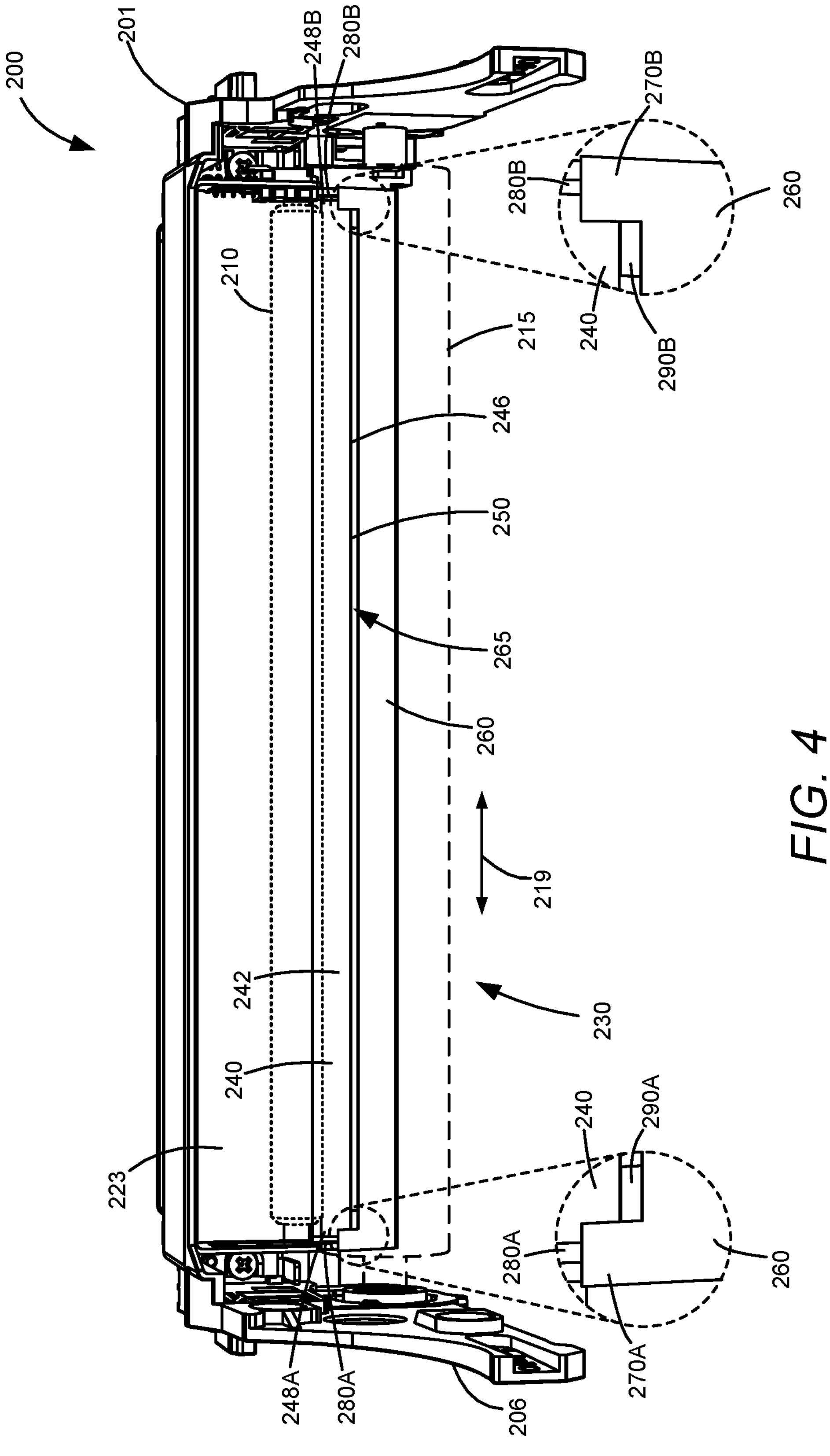
FIG. 4 is a front perspective view of the imaging unit shown in FIG. 2 showing an interior of the imaging unit including the cleaner assembly shown in FIG. 3.

FIG. 3 illustrates a side sectional view of at least a portion of imaging unit 200 including a charge roll 210, a developer roll 213, a photoconductive drum 215, and a cleaner assembly 230, according to an example embodiment. FIG. 4 is a front perspective view of imaging unit 200 with developer unit 202 removed to show an interior of imaging unit 200 including cleaner assembly 230 behind photoconductive drum 215 and charge roll 210 which are both shown in phantom lines, according to an example embodiment. Photoconductive drum 215 rotates in an operative rotational direction 217. Charge roll 210 forms a nip 212 with photoconductive drum 215 and charges an outer surface 216 of photoconductive drum 215 to a specified voltage. A laser beam from LSU 31 strikes the outer surface 216 of photoconductive drum 215 and discharges those areas it illuminates to form a latent image. Developer roll 213, which forms a nip 218 with photoconductive drum 215, transfers toner particles from a toner reservoir or sump (not shown) to areas of the outer surface 216 of photoconductive drum 215 discharged by the laser beam to form a toner image. The toner image on photoconductive drum 215 may then be transferred to a media sheet that is moved to be in contact with the outer surface 216 of photoconductive drum 215 at a transfer area 225. Alternatively, a transfer belt (not shown) may be used to collect the toner image from the outer surface 216 of photoconductive drum 215 and convey the toner image to a media sheet.

Cleaner assembly 230 is positioned adjacent to photoconductive drum 215 for removing residual toner that remains on the outer surface 216 of photoconductive drum 215 after the transfer of toner images from photoconductive drum 215 to the media sheet or transfer belt. In the embodiment illustrated, cleaner assembly 230 includes a cleaner blade 240 and a lower seal 260 extending along a longitudinal dimension 219 of photoconductive drum 215. Cleaner blade 240 is held in place by a bracket 223 mounted to a housing 201 of imaging unit 200. Cleaner blade 240 may be made from any suitable resilient material, such as urethane or polyurethane. Cleaner blade 240 has a front surface 242, a rear surface 244, and a cleaning edge 246. Cleaning edge 246 is in contact with the outer surface 216 of photoconductive drum 215 along longitudinal dimension 219 for removing toner from the outer surface 216 of photoconductive drum 215 when photoconductive drum 215 rotates in operative rotational direction 217. Lower seal 260 is an elongated seal that extends along a length of cleaner blade 240 along longitudinal dimension 219 such that an opening 265 for capturing residual toner removed from the outer surface 216 of photoconductive drum 215 is formed between cleaning edge 246 of cleaner blade 240 and lower seal 260. Opening 265 leads into a waste toner reservoir (not shown) in cleaner unit 204 for storing waste toner.

In the embodiment illustrated, lower seal 260 includes strips, flaps or tabs 270A, 270B (generally designated as tabs 270) projecting across respective longitudinal end sections 248A, 248B (generally designated as longitudinal end sections 248) of cleaner blade 240 such that tabs 270 are positioned between cleaning edge 246 of cleaner blade 240 and the outer surface 216 of photoconductive drum 215 at respective longitudinal end sections 248 of cleaner blade 240 to prevent contact between cleaning edge 246 of cleaner blade 240 and the outer surface 216 of photoconductive drum 215 at the longitudinal end sections 248 of cleaner blade 240. A remaining intermediate section 250 of cleaning edge 246 of cleaner blade 240 inboard of tabs 270 of lower seal 260 are exposed to contact the outer surface 216 of photoconductive drum 215 for removing residual toner on the outer surface 216 of photoconductive drum 215. In the embodiment illustrated, tabs 270 are rectangular in shape and integrally formed as a unitary piece with lower seal 260. In other embodiments, tabs 270 may have different shapes and/or may be separate strips or tabs that are coupled and/or attached to lower seal 260. Tabs 270 may be made of any relatively firm, low friction material, such as Mylar.

In the embodiment illustrated, cleaner assembly 230 includes end seals 280A, 280B (generally designated as end seals 280) and fabric seals 290A, 290B (generally designated as fabric seals 290) at respective longitudinal end sections 248 of cleaner blade 240 to prevent toner leakage around the longitudinal ends of photoconductive drum 215. End seal 280 contacts rear surface 244 of cleaner blade 240 at the longitudinal end section 248 of cleaner blade 240. Fabric seal 290 is disposed upstream from end seal 280 relative to the operative rotational direction 217 of photoconductive drum 215. In the embodiment illustrated, fabric seal 290 has a top edge 292 that is contiguous with and abuts against a corresponding bottom edge 282 of end seal 280 to prevent passage of residual toner through the interface between fabric seal 290 and end seal 280 at the longitudinal end section 248 of cleaner blade 240.

Figure 5A:
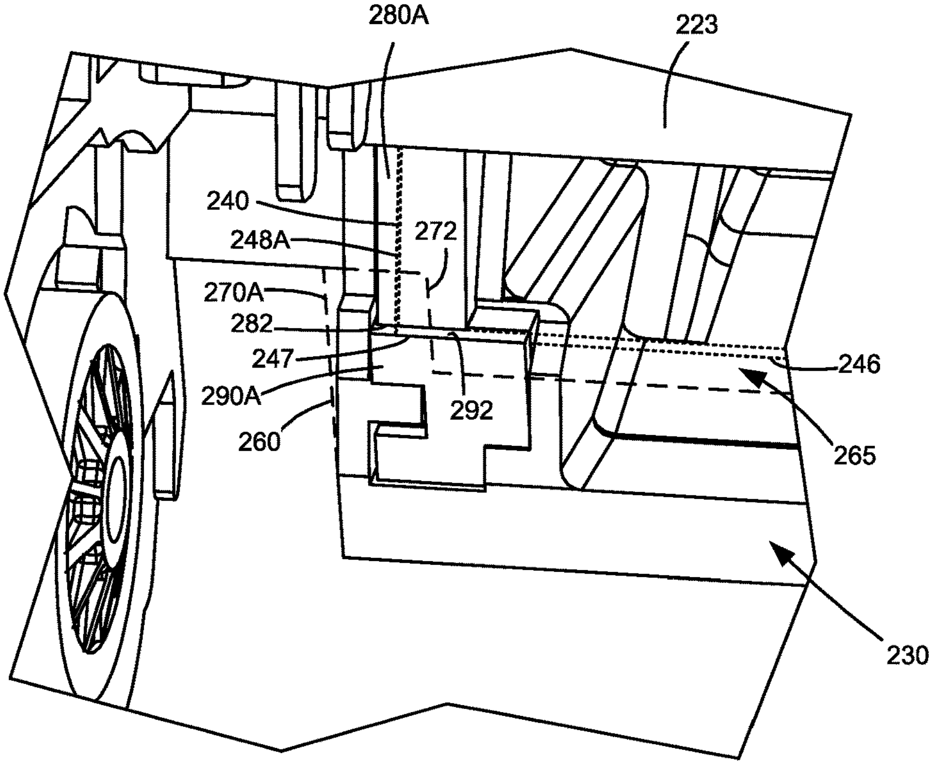
FIGS. 5A and 5B are perspective views of respective ends of the cleaner assembly shown in FIG. 4 including fabric seals according to one example embodiment.
Figure 5B:
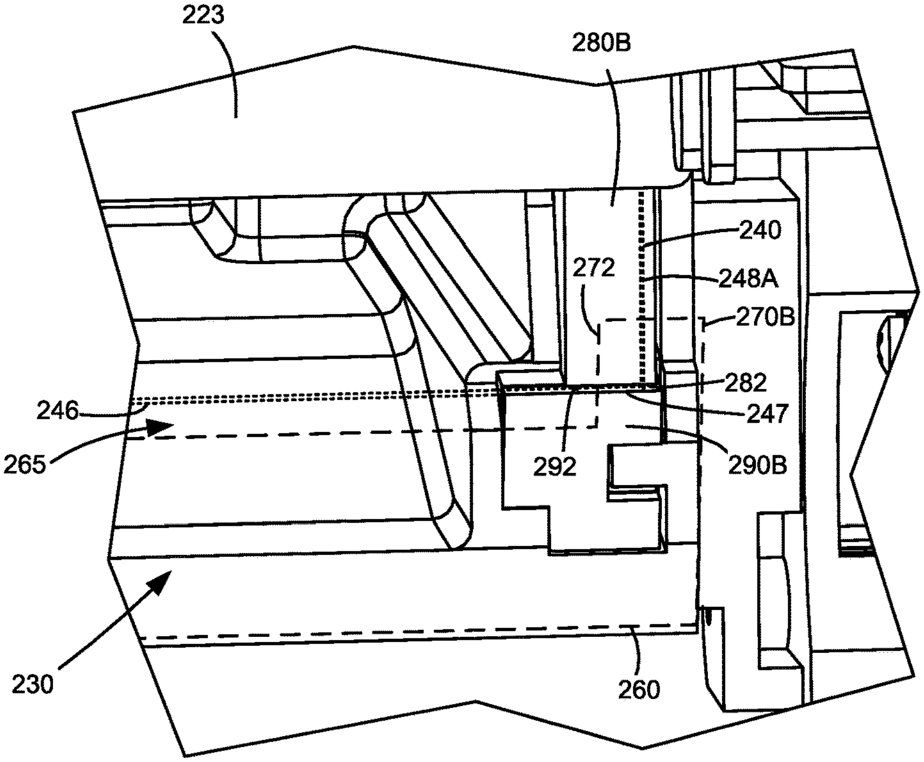

FIGS. 5A and 5B show close up views of end seals 280 and fabric seals 290 at the longitudinal end sections 248 of cleaner blade 240 with cleaner blade 240 and lower seal 260 shown in phantom lines. In the embodiment illustrated, end portions 247 of cleaning edge 246 at the longitudinal end sections 248 of cleaner blade 240 are flush along corresponding bottom edges 282 of end seals 280A, 280B so that end portions 247 of cleaning edge 246 are flush against corresponding top edges 292 of fabric seals 290. Since bottom edge 282 of end seal 280 and cleaning edge 246 of cleaner blade 240 both interface with top edge 292 of fabric seal 290 in the embodiment illustrated, the interface between end seal 280 and fabric seal 290 is substantially aligned with the interface between cleaner blade 240 and fabric seal 290.

Fabric seal 290 is positioned at a location where an inboard edge 272 of tab 270 intersects with cleaning edge 246 at the longitudinal end section 248 of cleaner blade 240. In the embodiment illustrated, at least a portion of fabric seal 290 is disposed upstream from cleaning edge 246 of cleaner blade 240 relative to the operative rotational direction 217 of photoconductive drum 215. Top edge 292 of fabric seal 290 abuts cleaning edge 246 at the longitudinal end section 248 of cleaner blade 240 with at least a portion of top edge 292 of fabric seal 290 extending toward opening 265 from inboard edge 272 of tab 270 along the length of cleaner blade 240. In the embodiment shown, at least a portion of fabric seal 290 that extends toward opening 265 from inboard edge 272 of tab 270 is exposed to contact the outer surface 216 of photoconductive drum 215 while a remaining portion of fabric seal 290 is covered by lower seal 260 and thus unexposed to photoconductive drum 215. When photoconductive drum 215 is installed in imaging unit 200, photoconductive drum 215 applies pressure against tab 270, fabric seal 290 and cleaner blade 240, which seals the interfaces between tab 270, fabric seal 290, and cleaner blade 240. The pressure from photoconductive drum 215 also reduces, the tendency for leaks around the interface between cleaning edge 246 and tab 270, such as at a point of intersection between cleaning edge 246 of cleaner blade 240 and inboard edge 272 of tab 270.

Figure 6A:
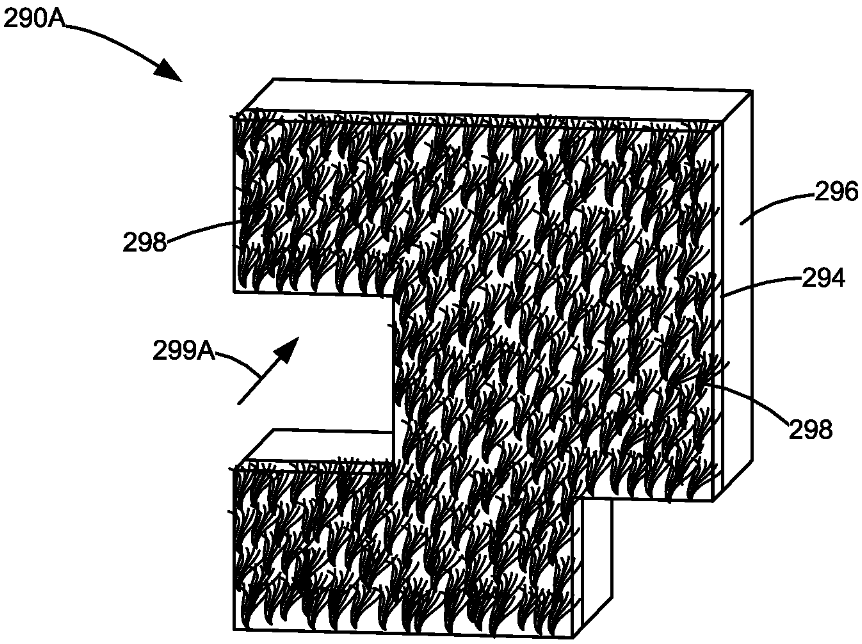
FIGS. 6A and 6B are perspective views of the fabric seals shown in FIGS. 5A and 5B, respectively, according to one example embodiment.
Figure 6B:
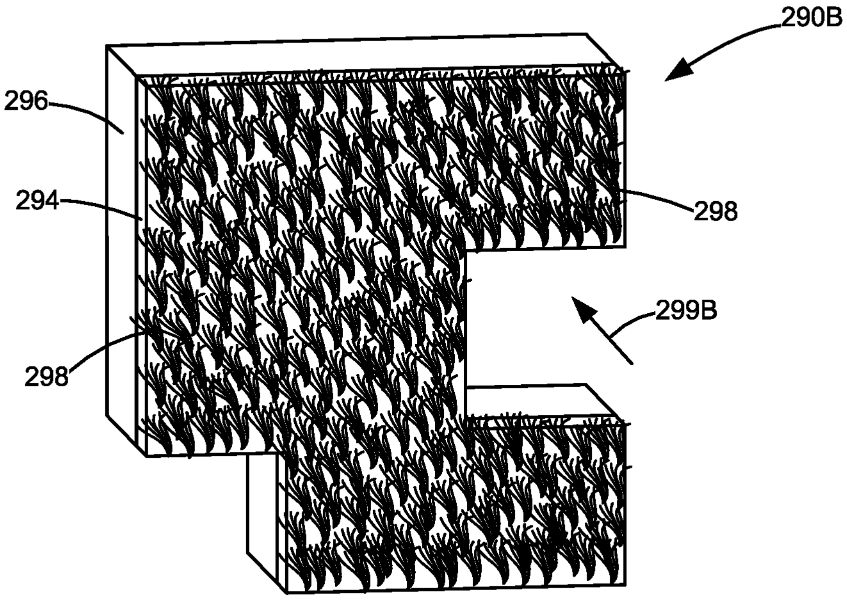

FIGS. 6A and 6B illustrate fabric seals 290A, 290B according to an example embodiment. In the embodiment illustrated, fabric seal 290 includes a woven fabric layer 294 backed by a foam layer 296, such as a urethane foam. In one embodiment, woven fabric layer 294 includes a woven fabric material having fibers 298 that are oriented in a direction that helps prevent toner near the longitudinal ends of photoconductive drum 215 from moving across fabric seal 290 towards tab 270. For example, when fabric seals 290 are mounted in imaging unit 200, fibers 298 are oriented at an angle, such as about 45°, relative to the longitudinal dimension 219 of photoconductive drum 215. In the embodiment illustrated, fibers 298 in fabric seal 290A are angled upward in direction 299A and fibers 298 in fabric seal 290B are angled upward in direction 299B such that woven fabric layers 294 of fabric seals 290A, 290B positioned at the opposite longitudinal end sections 248 of cleaner blade 240 have mirrored orientation relative to each other.

The angled fibers 298 allow fabric seal 290 to keep toner particles on the outer surface 216 of photoconductive drum 215 in areas outside of the imaging region where toner images are formed, such as toner particles between tab 270 and the imaging region, from migrating across fabric seal 290 toward the ends of photoconductive drum 215 as photoconductive drum 215 rotates. More specifically, fibers 298 of fabric seal 290 that are exposed to and/or in contact with the outer surface 216 of photoconductive drum 215 capture toner particles from the outer surface 216 of photoconductive drum 215 outside the imaging region and impede movement of the captured toner particles toward inboard edge 272 of tab 270 in order to prevent the captured toner particles from moving across fabric seal 290 toward inboard edge 272 of tab 270 as photoconductive drum 215 rotates. By having woven fabric layer 294 with oriented fibers 298, fabric seal 290 keeps residual toner particles away from the point of intersection between cleaning edge 246 of cleaner blade 240 and inboard edge 272 of tab 270 in order to help prevent toner leakage at the intersection between cleaner blade 240 and tab 270.

Figure 7A:
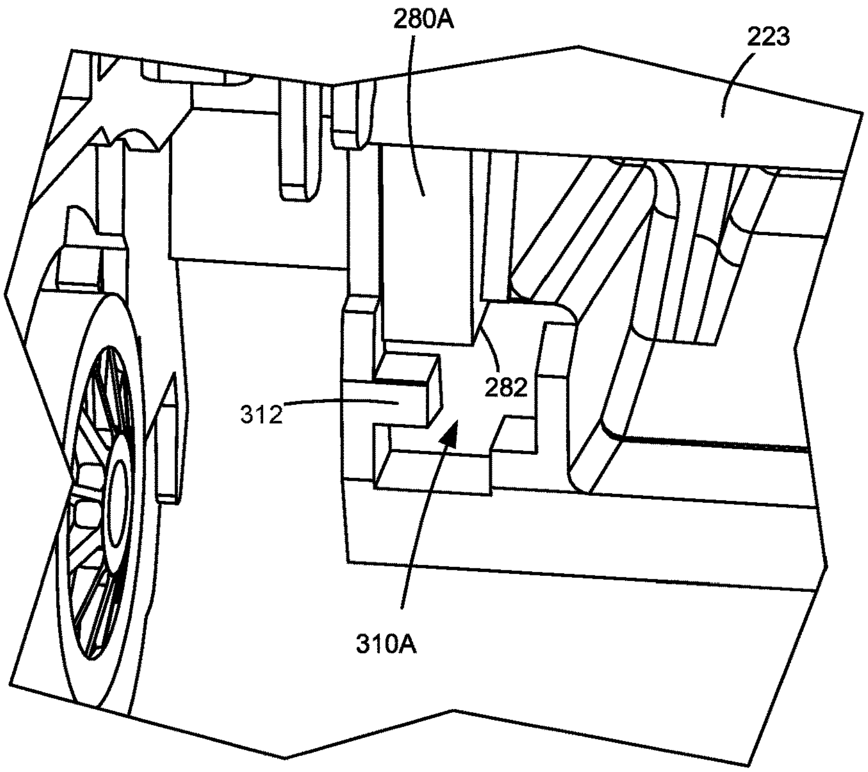
FIGS. 7A and 7B are perspective views illustrating positioning slots for receiving the fabric seals shown in FIGS. 6A and 6B, respectively, according to one example embodiment.
Figure 7B:
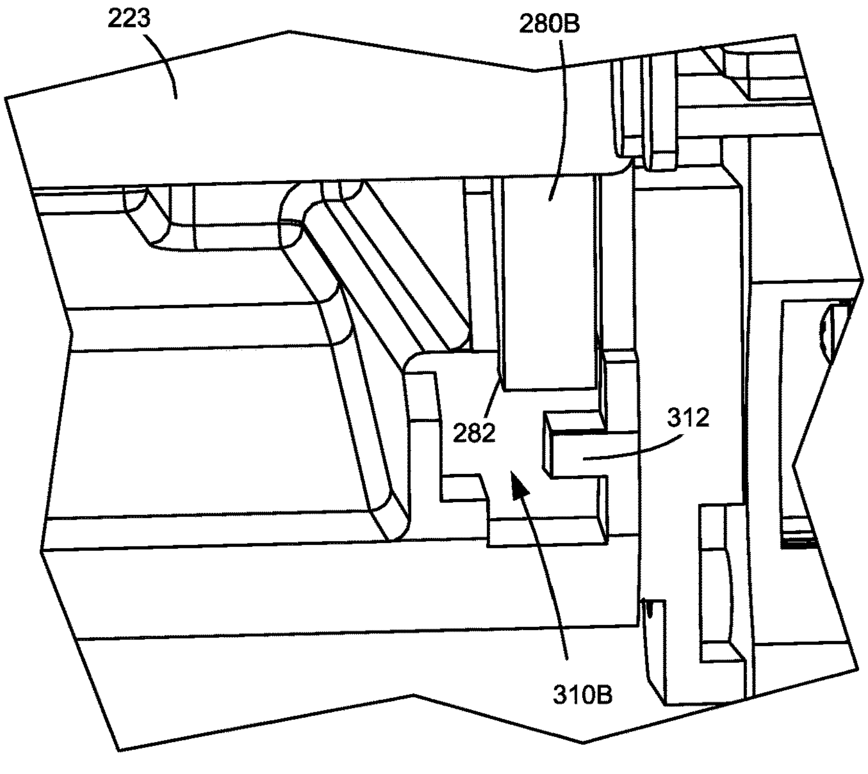

With reference to FIGS. 7A and 7B, imaging unit 200 includes positioning slots 310A, 310B (generally designated as positioning slots 310) that are sized to receive and hold fabric seals 290A, 290B, respectively, against their respective datums in imaging unit 200. Each positioning slot 310 is shaped to conform to the profile of a corresponding fabric seal 290. In one embodiment, fabric seals 290A, 290B may have different shapes and profiles relative to each other in order to avoid interchanging fabric seal arrangement and/or orientation in imaging unit 200 during assembly. For example, each fabric seal 290 is provided in a form of a cutout that corresponds to the shape of a corresponding positioning slot 310. Each positioning slot 310 may be formed with one or more locators 312 that are used to guide the assembly of a corresponding fabric seal 290 into imaging unit 200. In the embodiment illustrated, positioning slot 310A is shaped and sized to receive fabric seal 290A while positioning slot 310B is shaped and sized to receive fabric seal 290B. Fabric seal 290 may be disposed in positioning slot 310 without any adhesive. Alternatively, an adhesive may be used to mount fabric seal 290 it its operational position in imaging unit 200. In this manner, angular mispositioning of fibers 298 during assembly of fabric seals 290 into imaging unit 200 can be avoided.

It is understood that fabric seals 290 may be of other various geometrical shapes or profiles and may be of different lengths and/or dimensions or angular orientations as would occur to those skilled in the art. Further, it is understood that the cleaner assembly as described above can be utilized to remove residual waste toner from a photoconductive drum of an imaging device irrespective of the particular architecture selected for the toner cartridge, developer unit and photoconductive unit. For example, the cleaner assembly may be used in a removable imaging unit, such as imaging unit 200, as well as a removable toner cartridge unit that includes a charge roll and photoconductive drum.

The description of the details of the example embodiments have been described using the cleaning unit assembly for the photoconductive drum. However, it will be appreciated that the teachings and concepts provided herein are applicable to other residual and/or waste toner removal systems as well.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A cleaner assembly for an image forming device, comprising:

a rotatable photoconductive drum;

a cleaner blade having a cleaning edge in contact with an outer surface of the photoconductive drum along a longitudinal dimension of the photoconductive drum for removing toner from the outer surface of the photoconductive drum;

an elongated seal disposed adjacent to the cleaner blade and extending along a length of the cleaner blade such that an opening for capturing toner removed from the outer surface of the photoconductive drum is formed between the cleaning edge of the cleaner blade and the elongated seal, the elongated seal includes a tab projecting across a longitudinal end section of the cleaner blade such that the tab is positioned between the cleaning edge of the cleaner blade and the outer surface of the photoconductive drum at the longitudinal end section of the cleaner blade preventing contact between the cleaning edge of the cleaner blade and the outer surface of the photoconductive drum at the longitudinal end section of the cleaner blade; and a fabric seal positioned in a portion of the opening formed between the cleaning edge of the cleaner blade and the elongated seal at the longitudinal end section of the cleaner blade, at least a portion of the fabric seal is positioned inboard of the tab of the elongated seal along the length of the cleaner blade, wherein the fabric seal has an edge that abuts the cleaning edge of the cleaner blade at the longitudinal end section of the cleaner blade with at least a portion of the edge of the fabric seal extending toward the opening from an inboard edge of the tab along the length of the cleaner blade.

2. The cleaner assembly of claim 1, wherein at least a portion of the fabric seal is disposed upstream from the cleaning edge of the cleaner blade relative to an operative rotational direction of the photoconductive drum.

3. The cleaner assembly of claim 1, wherein the tab prevents contact between the cleaning edge of the cleaner blade and the outer surface of the photoconductive drum at the longitudinal end section of the cleaner blade and between a portion of the fabric seal and the outer surface of the photoconductive drum at the longitudinal end section of the cleaner blade.

4. The cleaner assembly of claim 1, wherein a portion of the fabric seal at the longitudinal end section of the cleaner blade is exposed to contact the outer surface of the photoconductive drum.

5. The cleaner assembly of claim 1, wherein the fabric seal includes a woven fabric layer backed by a foam layer.

6. The cleaner assembly of claim 1, wherein the fabric seal includes fibers that are oriented to capture toner from the outer surface of the photoconductive drum and impede the captured toner from moving across the fabric seal toward the tab.

7. The cleaner assembly of claim 1, wherein the fabric seal includes fibers that are oriented at an angle relative to the longitudinal dimension of the photoconductive drum.

8. A cleaner assembly for an image forming device, comprising:

a rotatable photoconductive drum;

a cleaner blade having a cleaning edge in contact with an outer surface of the photoconductive drum along a longitudinal dimension of the photoconductive drum for removing toner from the outer surface of the photoconductive drum;

a fabric seal, at least a portion of the fabric seal is disposed upstream from the cleaning edge of the cleaner blade relative to an operative rotational direction of the photoconductive drum; and an elongated seal disposed adjacent to the cleaner blade and extending along a length of the cleaner blade such that an opening for capturing toner removed from the outer surface of the photoconductive drum is formed between the cleaning edge of the cleaner blade and the elongated seal, the elongated seal includes a tab projecting across a longitudinal end section of the cleaner blade such that (1) the tab prevents contact between the cleaning edge of the cleaner blade and the outer surface of the photoconductive drum at the longitudinal end section of the cleaner blade and between a portion of the fabric seal and the outer surface of the photoconductive drum at the longitudinal end section of the cleaner blade and (2) a remaining portion of the cleaning edge of the cleaner blade and a remaining portion of the fabric seal are exposed to contact the outer surface of the photoconductive drum, wherein the fabric seal has an edge that abuts the cleaning edge of the cleaner blade at the longitudinal end section of the cleaner blade with at least a portion of the edge of the fabric seal extending toward the opening from an inboard edge of the tab along the length of the cleaner blade.

9. The cleaner assembly of claim 8, wherein said remaining portion of the fabric seal is positioned in a portion of the opening formed between the cleaning edge of the cleaner blade and the elongated seal at the longitudinal end section of the cleaner blade.

10. The cleaner assembly of claim 8, wherein said remaining portion of the fabric seal is positioned inboard of the tab of the elongated seal along the length of the cleaner blade.

11. The cleaner assembly of claim 8, wherein the fabric seal includes a woven fabric layer backed by a foam layer.

12. The cleaner assembly of claim 8, wherein the fabric seal includes fibers that are oriented to capture toner from the outer surface of the photoconductive drum and impede the captured toner from moving across the fabric seal toward the tab.

13. The cleaner assembly of claim 8, wherein the fabric seal includes fibers that are oriented at an angle relative to the longitudinal dimension of the photoconductive drum.

14. A cleaner assembly for an image forming device, comprising:

a rotatable photoconductive drum;

a cleaner blade having a cleaning edge in contact with an outer surface of the photoconductive drum along a longitudinal dimension of the photoconductive drum for removing toner from the outer surface of the photoconductive drum;

an elongated seal disposed adjacent to the cleaner blade and extending along a length of the cleaner blade such that an opening for capturing toner removed from the outer surface of the photoconductive drum is formed between the cleaning edge of the cleaner blade and the elongated seal, the elongated seal includes a tab projecting across a longitudinal end section of the cleaner blade such that the tab is positioned between the cleaning edge of the cleaner blade and the outer surface of the photoconductive drum at the longitudinal end section of the cleaner blade preventing contact between the cleaning edge of the cleaner blade and the outer surface of the photoconductive drum at the longitudinal end section of the cleaner blade; and a fabric seal disposed upstream from the longitudinal end section of the cleaner blade relative to a direction of rotation of the photoconductive drum, the fabric seal has an edge that abuts the cleaning edge of the cleaner blade at the longitudinal end section of the cleaner blade with at least a portion of the edge of the fabric seal extending toward the opening from an inboard edge of the tab along the length of the cleaner blade.

15. The cleaner assembly of claim 14, wherein the tab prevents contact between the cleaning edge of the cleaner blade and the outer surface of the photoconductive drum at the longitudinal end section of the cleaner blade and between a portion of the fabric seal and the outer surface of the photoconductive drum at the longitudinal end section of the cleaner blade.

16. The cleaner assembly of claim 15, wherein a remaining portion of the fabric seal is exposed to contact the outer surface of the photoconductive drum.

17. The cleaner assembly of claim 14, wherein the fabric seal includes a woven fabric layer backed by a foam layer.

18. The cleaner assembly of claim 14, wherein the fabric seal includes fibers that are oriented to capture toner from the outer surface of the photoconductive drum and impede the captured toner from moving across the fabric seal toward the tab.

* * * * *